United States Patent
Yamashita et al.

(10) Patent No.: US 10,733,125 B2
(45) Date of Patent: Aug. 4, 2020

(54) MICROCOMPUTER

(71) Applicant: DENSO CORPORATION, Kariya, Aichi-pref. (JP)

(72) Inventors: Tatsuya Yamashita, Kariya (JP); Kenji Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/549,480

(22) Filed: Aug. 23, 2019

(65) Prior Publication Data

US 2019/0377697 A1 Dec. 12, 2019

Related U.S. Application Data

(63) Continuation of application No. PCT/JP2018/002284, filed on Jan. 25, 2018.

(30) Foreign Application Priority Data

Mar. 28, 2017 (JP) .................................. 2017-062849

(51) Int. Cl.
*G06F 13/38* (2006.01)
*G06F 9/50* (2006.01)

(52) U.S. Cl.
CPC ............ *G06F 13/38* (2013.01); *G06F 9/5027* (2013.01); *G06F 2213/40* (2013.01)

(58) Field of Classification Search
CPC ..... G06F 13/36; G06F 9/5027; G06F 2213/40
See application file for complete search history.

(56) References Cited

U.S. PATENT DOCUMENTS

| | | | |
|---|---|---|---|
| 8,131,900 B2 * | 3/2012 | Takehara | G06F 11/0793 710/110 |
| 10,108,469 B2 * | 10/2018 | Mitsuishi | G06F 11/0721 |
| 2009/0216974 A1 * | 8/2009 | Morishima | G06F 9/4856 711/162 |
| 2016/0034368 A1 | 2/2016 | Nishii et al. | |
| 2016/0092320 A1 * | 3/2016 | Baca | G06F 11/1641 714/49 |

FOREIGN PATENT DOCUMENTS

| | | |
|---|---|---|
| JP | 2015-138529 A | 7/2015 |
| JP | 5978873 B2 | 8/2016 |

\* cited by examiner

*Primary Examiner* — Henry Tsai
*Assistant Examiner* — Christopher Daley
(74) *Attorney, Agent, or Firm* — Posz Law Group, PLC (57) ABSTRACT

A microcomputer including first and second CPUs is provided. The first and second CPUs may execute identical control programs in parallel. The microcomputer may control a write access by the first or second CPU. The microcomputer may compare an output of the first CPU with an output of the second CPU. Data is written to a write target unit. The microcomputer outputs a write response signal to the first and second CPUs when a data write destination of the first and second CPUs is the write target unit. The microcomputer outputs an abnormality determination signal when data output from the first CPU mismatches with data output from the second CPU. The microcomputer writes the data to the write target unit when the data write destination of the first and second CPUs is the write target unit and the abnormality determination signal is not input.

13 Claims, 14 Drawing Sheets

MICROCOMPUTER

CROSS REFERENCE TO RELATED APPLICATIONS

The present application is a continuation application of International Patent Application No. PCT/JP2018/002284 filed on Jan. 25, 2018, which designated the U.S. and claims the benefit of priority from Japanese Patent Application No. 2017-062849 filed on Mar. 28, 2017. The entire disclosures of all of the above applications are incorporated herein by reference.

TECHNICAL FIELD

The present disclosure relates to a microcomputer with lockstep system that monitors abnormality by duplicating processing by two CPUs.

BACKGROUND

As an example of an electronic control device having the lockstep system, each of two processor cores accesses a switch device via each dedicated path. The switch device instructs one of the two processor cores to switch the processing.

SUMMARY

The present disclosure provides a microcomputer including first and second CPUs. The first and second CPUs may execute identical control programs in parallel. The microcomputer may control a write access by the first or second CPU.

BRIEF DESCRIPTION OF DRAWINGS

The features and advantages of the present disclosure will become more apparent from the following detailed description made with reference to the accompanying drawings. In the drawings.

DETAILED DESCRIPTION

For example, when a dedicated path is employed, it is necessary for a CPU to have a configuration that corresponds to the dedicated path. Thus, a general-purpose CPU cannot be employed. The switch device may be connected to the general-purpose bus. In this case, when the two CPUs access the same address, the data written by each CPU cannot be individually stored. Although the data can be individually stored by the accesses of two CPUs to the two different addresses, there remains a difficulty that multiple accesses are required.

The present disclosure provides a microcomputer capable of efficiently realizing a lock step system using a general-purpose CPU.

An example embodiment of the present disclosure provides a microcomputer including first and second CPUs, a write control unit, a determination unit, a write target unit. The first and second CPUs execute identical control programs in parallel. The write control unit controls a write access by the first or second CPU. The determination unit compares an output of the first CPU with an output of the second CPU. Data is written by the write control unit to the write target unit. The write control unit outputs a write response signal to the first and second CPUs when a data write destination of the first and second CPUs is the write target unit. The determination unit outputs an abnormality determination signal to the write control unit when data output from the first CPU mismatches with data output from the second CPU. The write control unit writes the data to the write target unit when the data write destination of the first and second CPUs is the write target unit and the abnormality determination signal is not input to the write control unit.

In the example embodiment of the present disclosure, the write of the data to the write target unit is executed with the lock step system by the two CPUs and via the write control unit. One of the two CPUs is connected to the write control unit via the system bus. In the remaining one of the two CPUs, at least a path for writing the data is directly connected to the determination unit. With this configuration, no contention by two CPUs occurs on the system bus. The write control unit immediately outputs the write response signal to the CPUs when the data write destination is the write target unit. Thus, the CPUs do not enter an execution waiting state. With this configuration, the lock step system can be realized without reducing the processing efficiency of the CPUs.

First Embodiment

Figure 1:
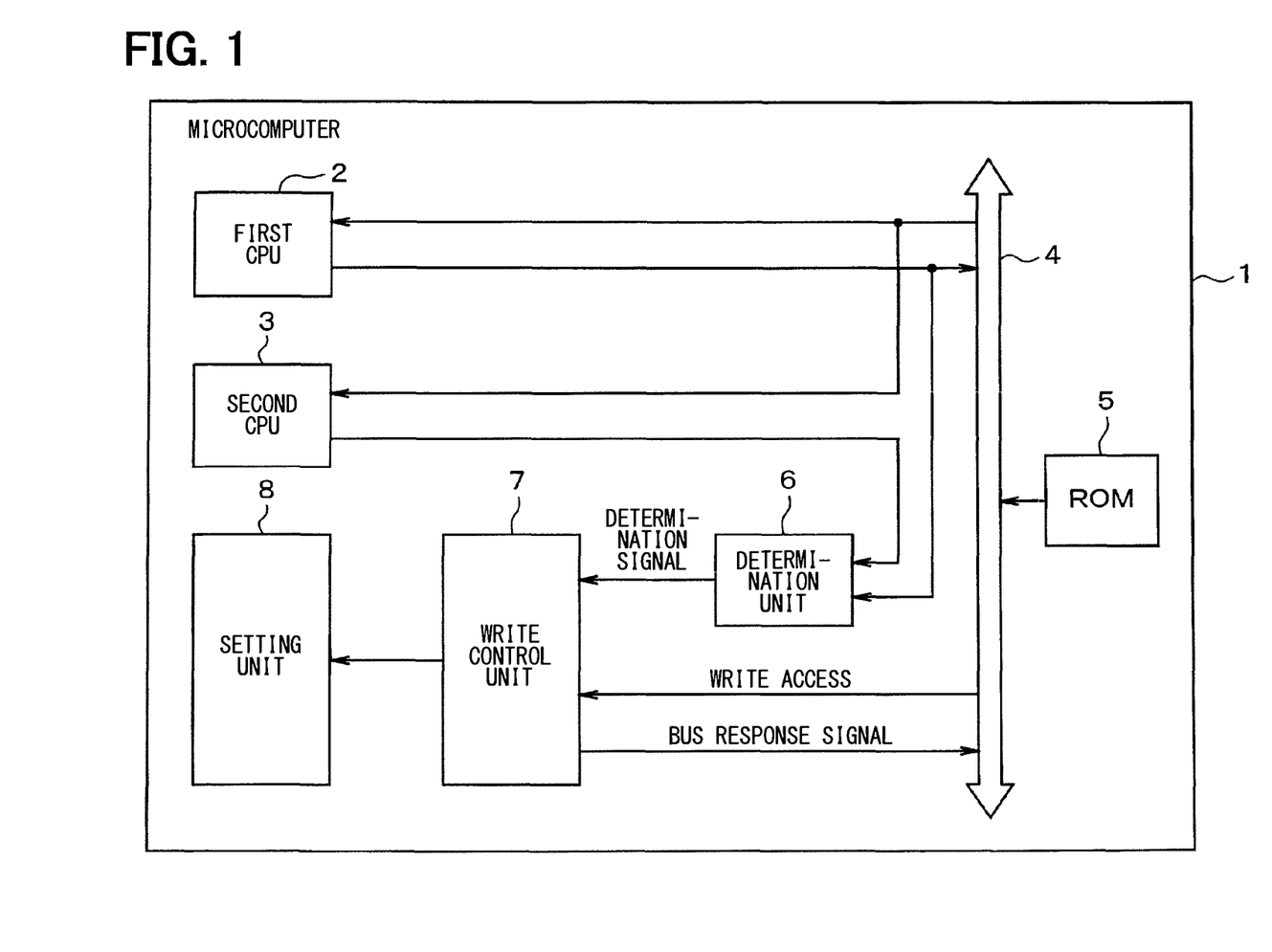
FIG. 1 is a block diagram schematically showing a configuration of a microcomputer with respect to main units according to a first embodiment.

As shown in FIG. 1, a microcomputer 1 according to the present embodiment includes a first CPU 2 and a second CPU 3. The CPU 2 is connected to peripheral circuits such as a ROM 5 and a write control unit 7 via a system bus 4. The CPUs 2 and 3 execute identical control programs in parallel. The CPU 2 accesses the ROM 5, and the CPU 3 reads out data read out by the CPU 2 via the system bus 4. The CPU 2 is directly connected to a determination unit 6 without passing through the system bus 4.

Write of data to each peripheral circuit is executed substantially by the CPU 2. The determination unit 6 compares the data output from the CPU 3 with the data output from the CPU 2. The determination unit 6 outputs a determination signal as a comparison result to the write control unit 7. The determination signal is maintained at high level as long as the data of the CPUs 2 and 3 match, and changes to low level when the data mismatch. The state in which the determination signal changes to low level corresponds to an abnormality determination signal.

The write control unit 7 controls write of data to the setting unit 8 that corresponds to a write target unit. When the address output from the CPU 2 to the bus 4 indicates the setting unit 8 as an access destination, the write control unit 7 outputs a bus response signal as an acknowledge to the CPUs 2 and 3. The CPU 2 may access the setting unit 8. In this case, when the determination signal indicates high level, the data output from the CPU 2 is written to the setting unit 8. An example of specific configuration of the setting unit 8 will be shown in a following embodiment.

Figure 2:
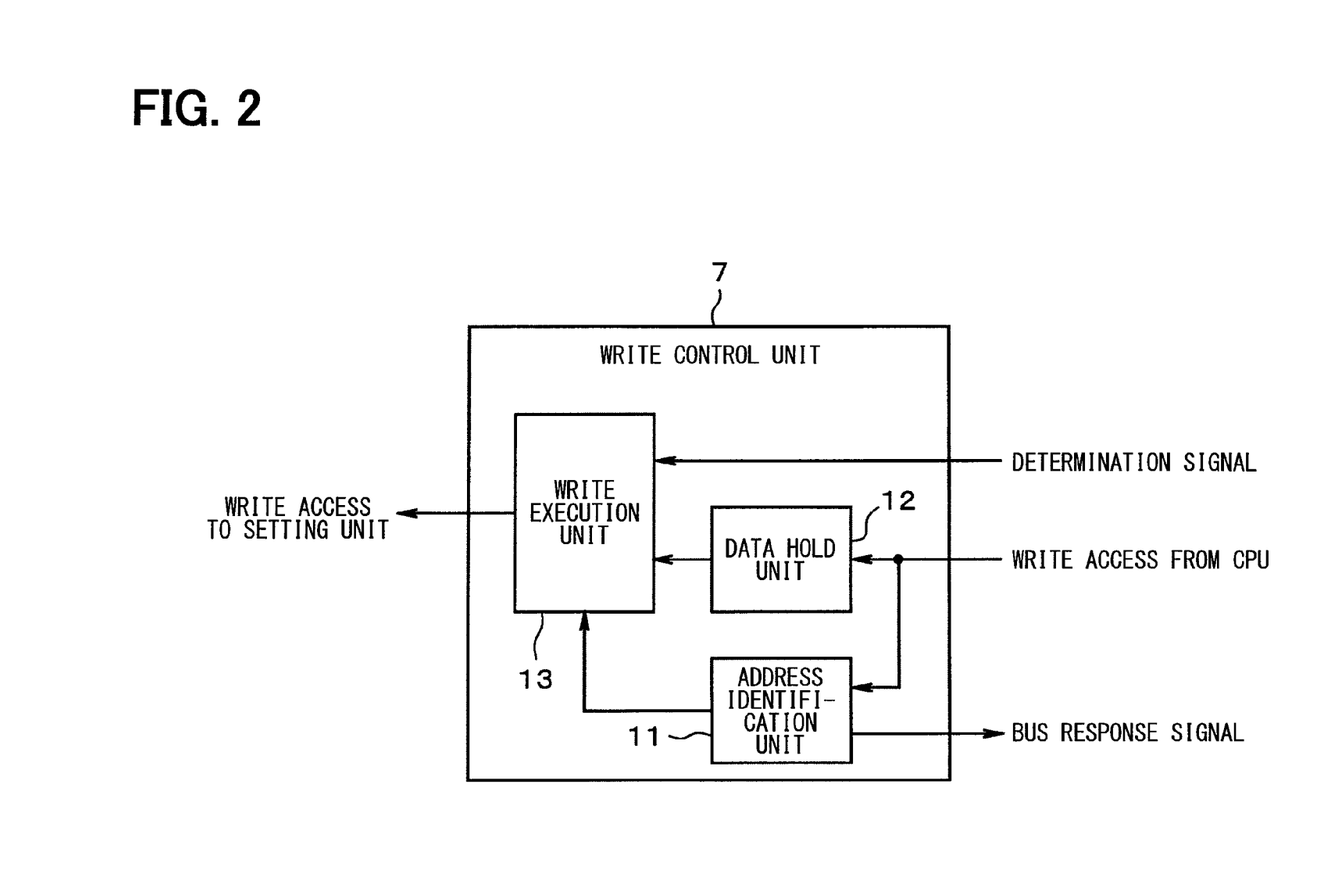
FIG. 2 is a block diagram schematically showing a configuration of a write control unit.

As shown in FIG. 2, the write control unit 7 includes an address identification unit 11, a data hold unit 12 and a write execution unit 13. The address identification unit 11 identifies the access address of the CPU 2 and outputs the bus response signal when the access destination indicates the setting unit 8 as described above. The data hold unit 12 is constituted as a buffer for holding the write data output from the CPU 2. When the access destination indicates the setting unit 8 and the determination signal is at high level, the write execution unit 13 outputs the data held in the data hold unit 12 to the setting unit 8 and writes the data in the setting unit 8.

Figure 3:
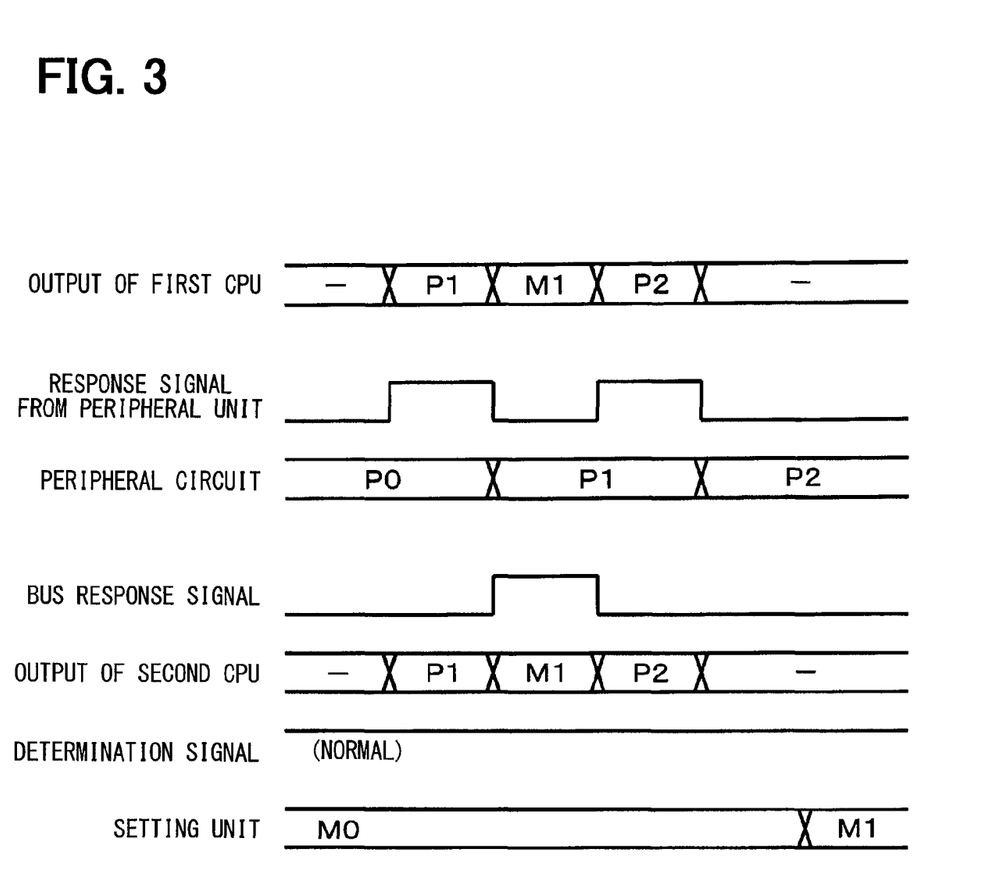
FIG. 3 is a time chart during a normal operation.

Next, operations of the present embodiment will be described. As shown in FIG. 3, when the operations of the CPUs 2 and 3 are normal, the CPUs 2 and 3 have the identical access targets and the identical write data. Each of P0 to P2 shown in the figures indicates an access instruction or the write data to another peripheral circuit (not shown) other than the write control unit 7 and the setting unit 8. Each of M0 and M1 indicates the access instruction or the write data to the setting unit 8. "-" indicates that there is no instruction. The setting unit 8 has high security requirement for its operation, and another peripheral circuit has relatively low security requirement for the operation.

When both the CPUs 2 and 3 access with P1 or P2, the corresponding peripheral circuit returns the response signal. The access result is reflected on the peripheral circuit one cycle of the system clock cycle after the start of access by the CPU 2. When both the CPUs 2 and 3 access with M1, the write control unit 7 returns the bus response signal. The determination signal maintains high level. The access result is reflected on the setting unit 8 three cycles after the start of the access by the CPU 2.

Figure 4:
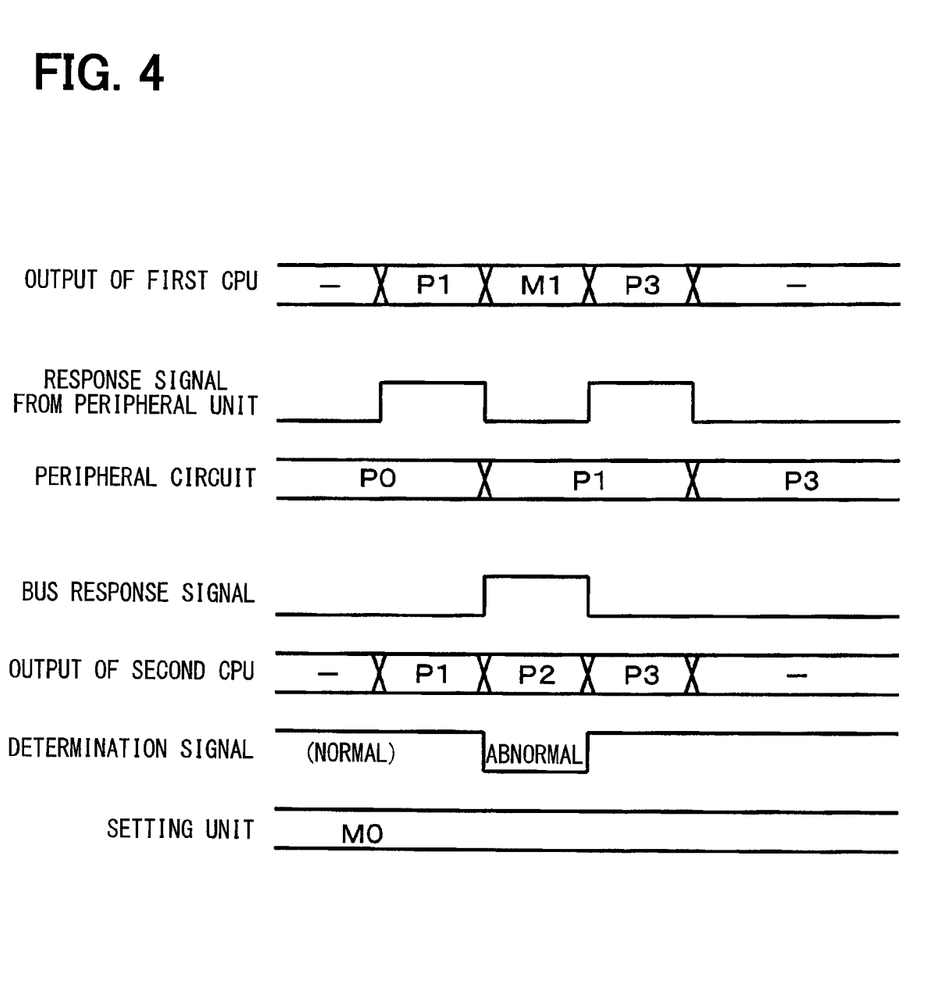
FIG. 4 is a time chart during an abnormal operation.

As shown in FIG. 4, it is assumed that when the CPU 2 accesses with M1, the CPU 3 accesses with P2. In this case, the determination unit 6 changes the determination signal to low level due to the access state and the mismatch of the data. Thus, the write control unit 7 returns the bus response signal but does not execute write to the setting unit 8, and the status of the setting unit 8 remains M0.

As described above, according to the present embodiment, the first CPU 2 and the second CPU 3 execute the identical control programs in parallel, the write control unit 7 controls the write access by the CPUs 2 and 3, and the determination unit 6 compares the output of the CPU 2 and the output of CPU 3. The write control unit 7 writes the data to the setting unit 8. The write control unit 7 outputs the write response signal to the CPUs 2 and 3 when the data write destination by the CPUs 2 and 3 indicates the setting unit 8. The determination unit 6 changes the write determination signal to low level when the data output by the CPUs 2 and 3 do not match. The write control unit 7 writes the data to the setting unit 8 when the write destination of the data output by the CPUs 2 and 3 indicates the setting unit 8 and the determination signal is at high level.

That is, the write of data to the setting unit 8 is executed by the lock step system by the CPUs 2 and 3 and via the write control unit 7. Then, the CPU 2 is connected to the write control unit 7 via the system bus 4. In the CPU 3, at least a path for write data is directly connected to the determination unit 6. With this configuration, no contention between CPUs 2 and 3 occurs on system bus 4. The write control unit 7 immediately outputs the bus response signal to the CPUs 2 and 3 when the data write destination indicates the setting unit 8. Thus, the CPUs 2 and 3 do not enter an execution waiting state. With this configuration, the lock step system can be achieved without reducing the processing efficiency of the CPUs 2 and 3.

Second Embodiment

Figure 5:
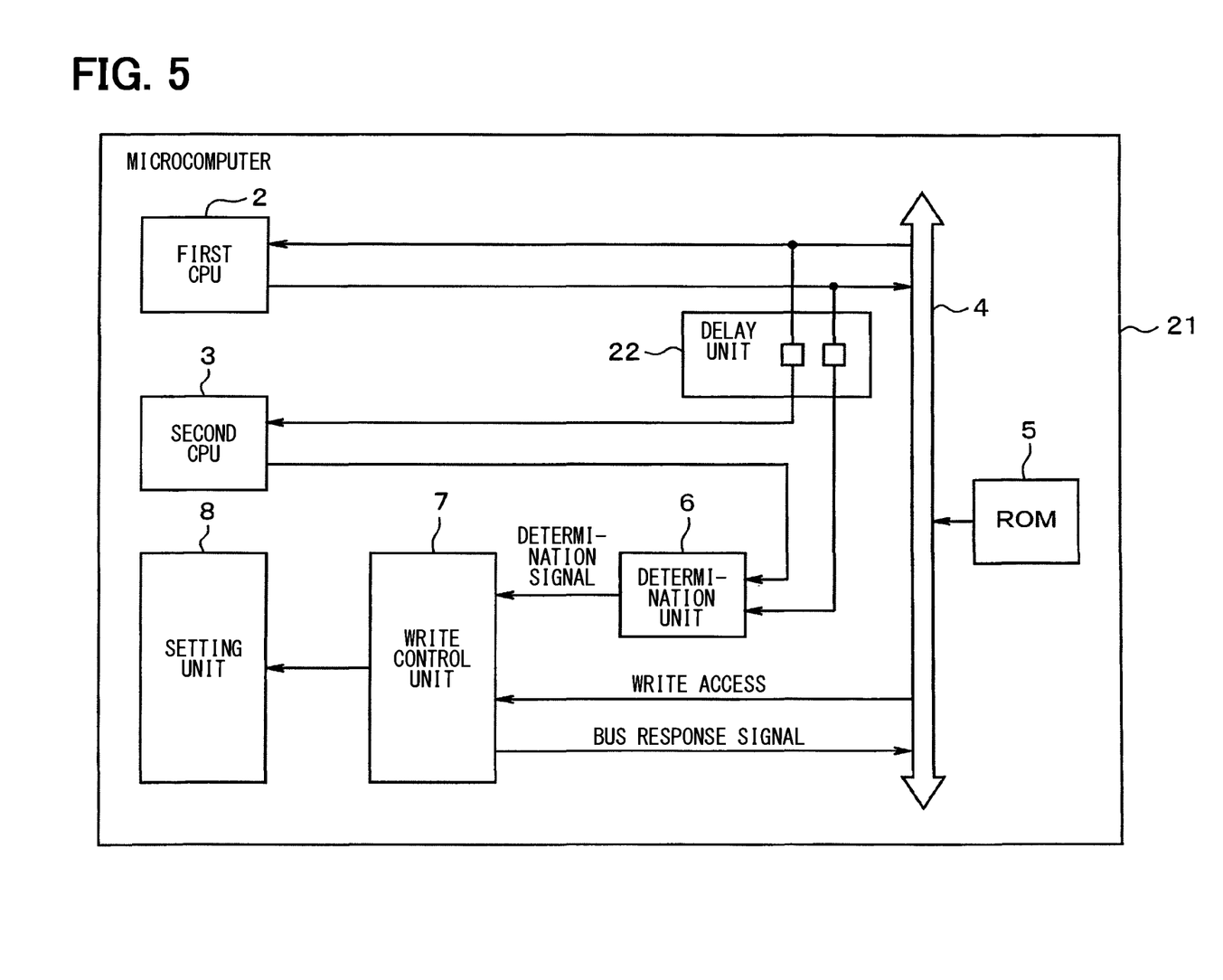
FIG. 5 is a block diagram schematically showing a configuration of a microcomputer with respect to main units according to a second embodiment.

Hereinafter, the same components as those of the first embodiment are denoted by the same reference numerals, and descriptions of the same components will be omitted, and different portions will be described. As shown in FIG. 5, a microcomputer 21 according to a second embodiment includes a delay unit 22. The delay unit 22 is located on a path in which the second CPU 3 fetches an instruction via the bus 4 and on a path in which the data output from the first CPU 2 is input to the determination unit 6. The delay unit 22 adds a delay time of 2 cycles to each path. The delay unit 22 corresponds to first and second delay units.

Figure 6:
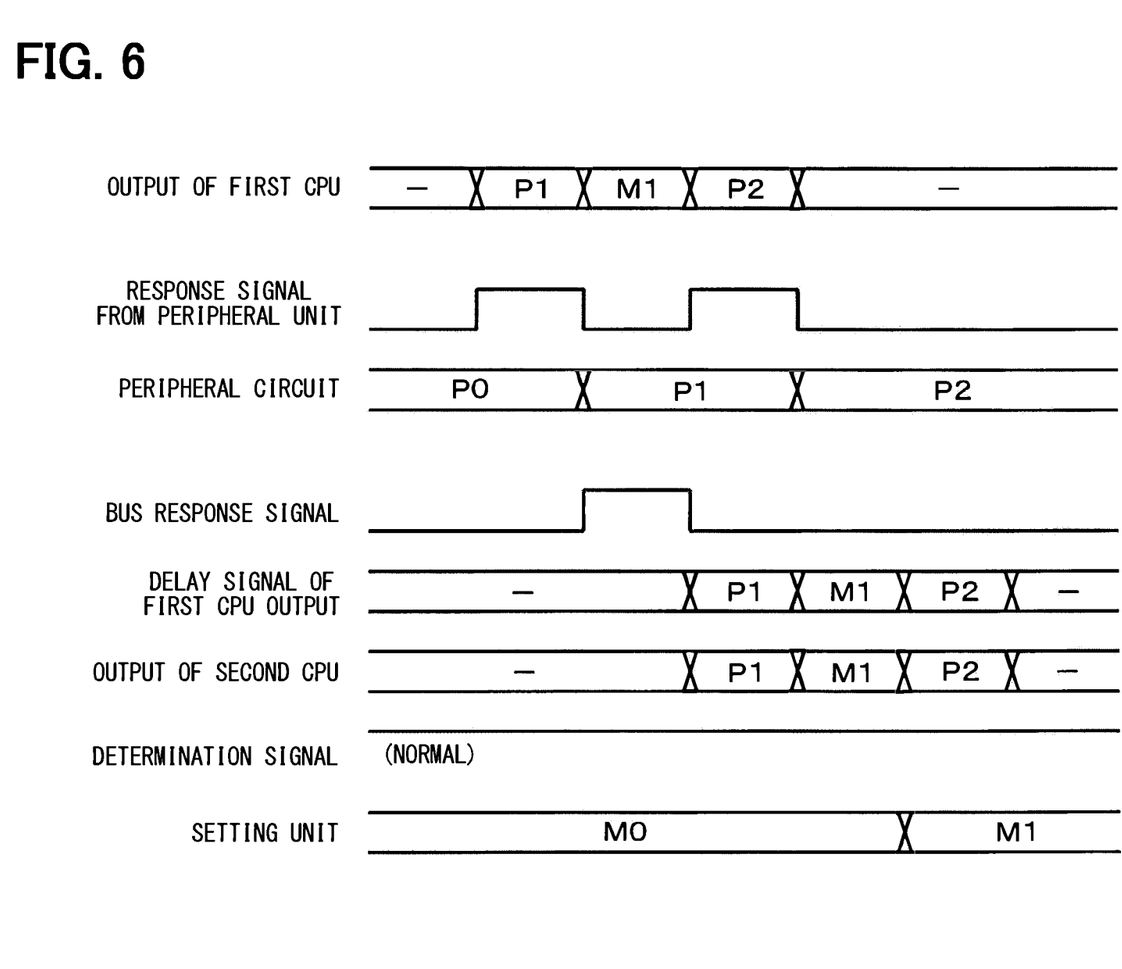
FIG. 6 is a time chart during a normal operation.
Figure 7:
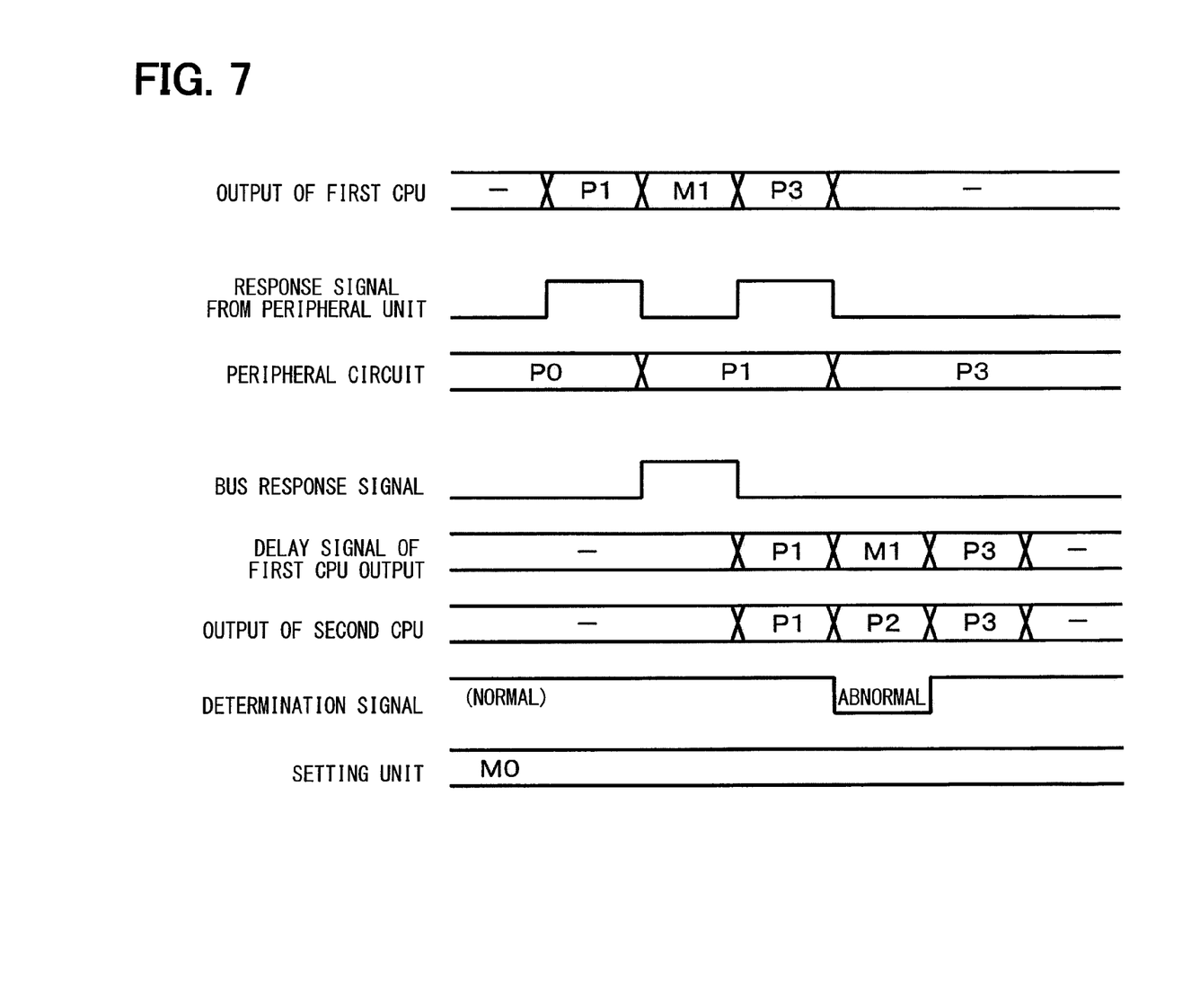
FIG. 7 is a time chart during an abnormal operation.

Next, operations of the second embodiment will be described. As shown in FIG. 6, the access executed by the CPU 3 is delayed by two cycles with respect to the access executed by the CPU 2. On the other hand, the data to be compared by the determination unit 6 is input at the same time. In the operation at the time of occurrence of an abnormality shown in FIG. 7, the time point at which the determination unit 6 changes the determination signal to low level is delayed by two cycles from the time point at which the write control unit 7 returns the bus response signal.

As in the first embodiment, the execution time points of the CPUs 2 and 3 may be the same. In this case, the data values affected by the noise may change in the same manner, so that the comparison result may match. On the other hand, the execution time point of the CPU 3 is shifted from the execution time point of the CPU 2 as in the second embodiment so that it is possible to reduce the possibility that both of the CPUs 2 and 3 receive the same influence of noise.

Third Embodiment

Figure 8:
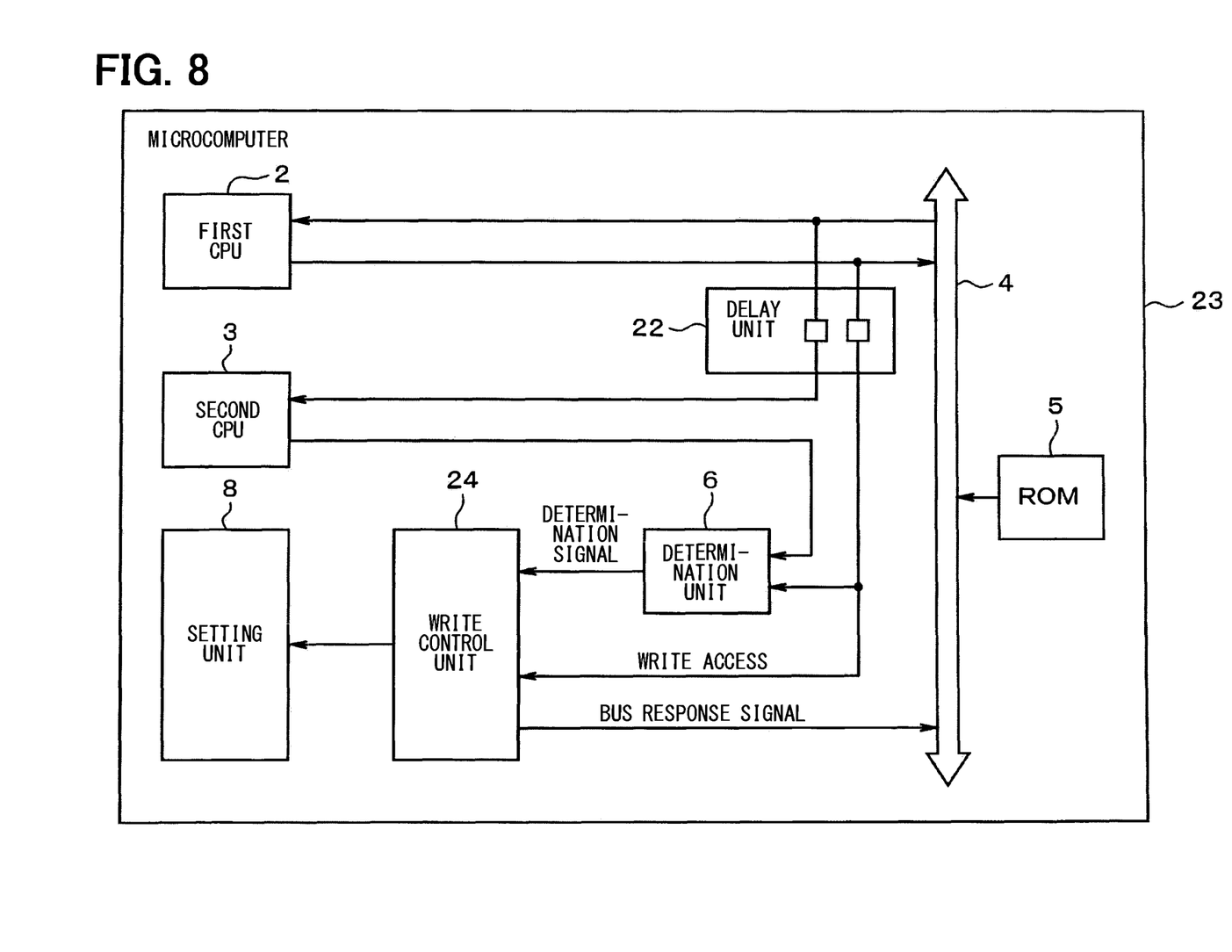
FIG. 8 is a block diagram schematically showing a configuration of a microcomputer with respect to main units according to a third embodiment.

As shown in FIG. 8, in a microcomputer 23 according to a third embodiment, the CPU 2 accesses the write control unit 24 using the path in which the data is input to the determination unit 6 via the delay unit 22 without passing through the system bus 4. In this case, the input time point of the data to the write control unit 24 is the same as the time point where the determination unit 6 inputs the data to the data to the write control unit 24. Thus, the data hold unit 12 can be deleted from the write control unit 24.

Fourth Embodiment

Figure 9:
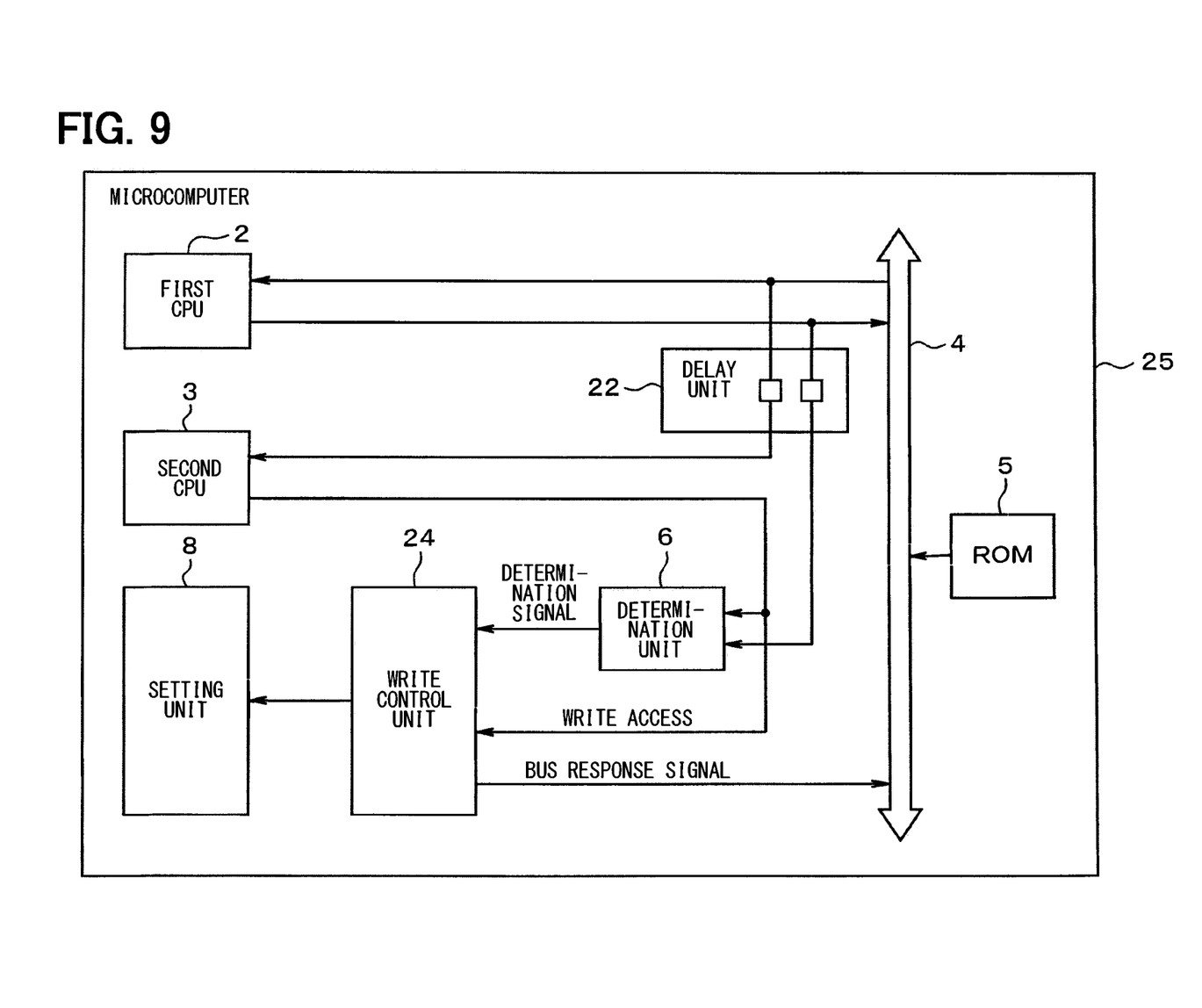
FIG. 9 is a block diagram schematically showing a configuration of a microcomputer with respect to main units according to a fourth embodiment.

As shown in FIG. 9, in a microcomputer 25 according to a fourth embodiment, the path for accessing the write control unit 24 is provided by the path in which the CPU 3 outputs the data to the determination unit 6. With this configuration, the write control unit 24 can be used as in the third embodiment.

Fifth Embodiment

Figure 10:
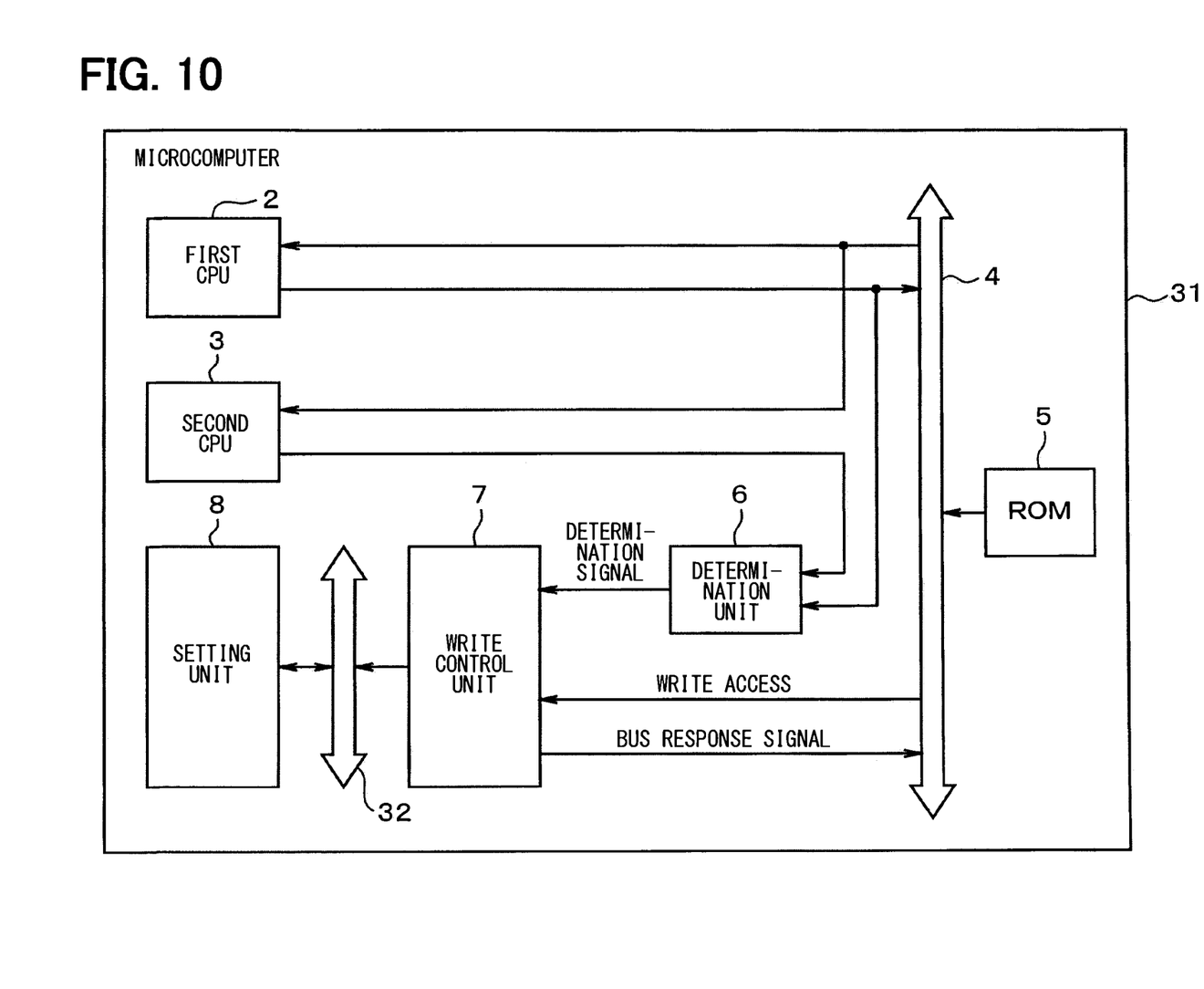
FIG. 10 is a block diagram schematically showing a configuration of a microcomputer with respect to main units according to a fifth embodiment.

As shown in FIG. 10, in a microcomputer 31 according to a fifth embodiment, the write control unit 7 and the setting unit 8 is connected via a local bus 32 in the configuration of the first embodiment. The local bus 32 corresponds to a dedicated bus. With this configuration, as with the setting unit 8, it is possible to provide extensibility for adding a peripheral circuit with high security requirement.

Sixth Embodiment

Figure 11:
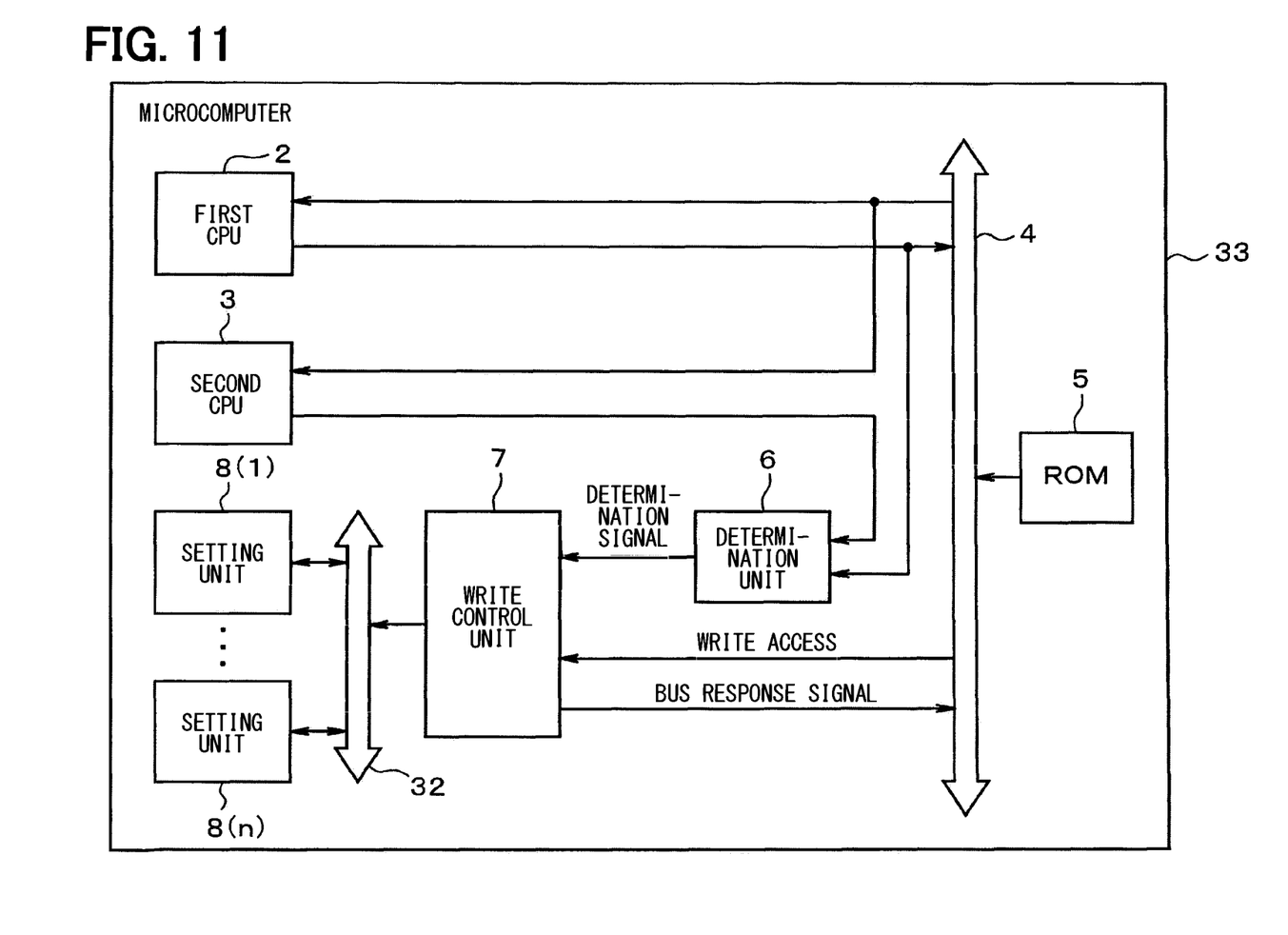
FIG. 11 is a block diagram schematically showing a configuration of a microcomputer with respect to main units according to a sixth embodiment.

As shown in FIG. 11, in a microcomputer 33 according to the sixth embodiment, a plurality of setting units 8 (1) to 8 (n) are connected to the local bus 32 of the fifth embodiment. The fifth embodiment can be extended as in the sixth embodiment.

Seventh Embodiment

Figure 12:
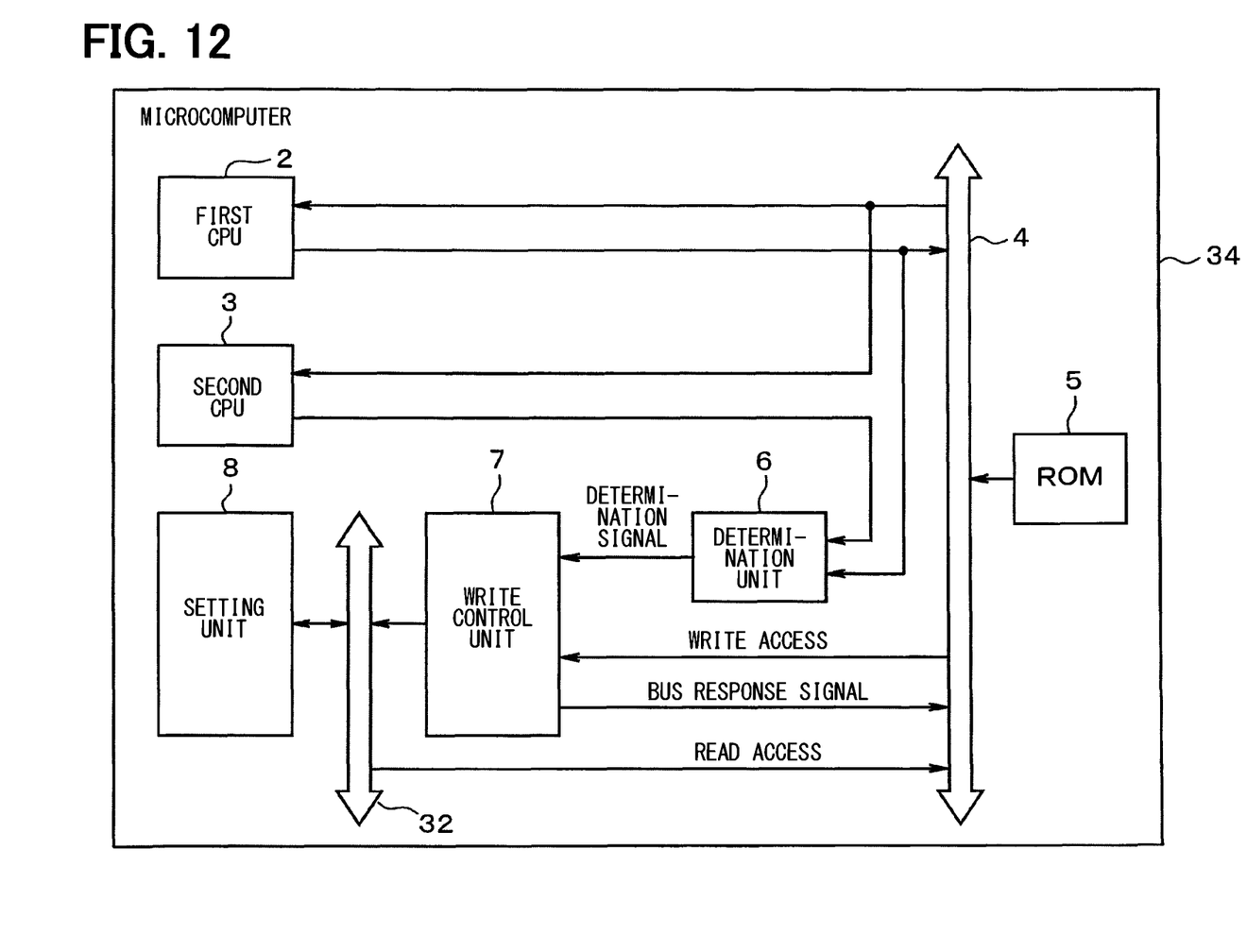
FIG. 12 is a block diagram schematically showing a configuration of a microcomputer with respect to main units according to a seventh embodiment.

As shown in FIG. 12, in a microcomputer 34 according to a seventh embodiment, a read path of the local bus 32 is connected to a read path of the system bus 4 in the configuration of the fifth embodiment. Each of the CPUs 2 and 3 may read out the data stored in the setting unit 8. Each of the CPUs 2 and 3 is capable of reading out the data via the local bus 32. With this configuration, the data can be read out quickly from the setting unit 8.

Eighth Embodiment

Figure 13:
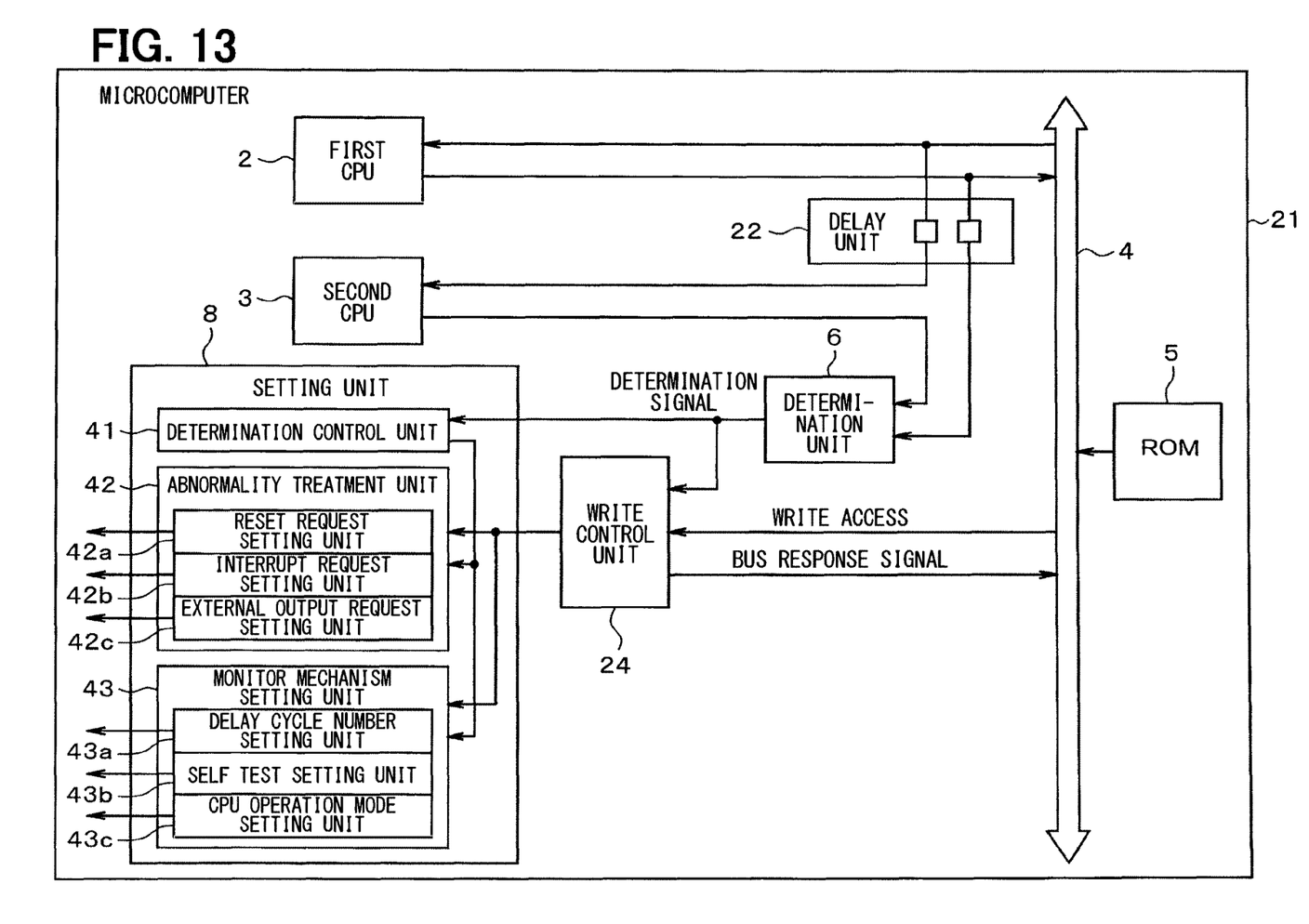
FIG. 13 is a block diagram schematically showing a configuration of a microcomputer with respect to main units according to an eighth embodiment.

As shown in FIG. 13, an eighth embodiment shows a specific configuration example of the setting unit 8 in the microcomputer 21 of the second embodiment. The setting unit 8 includes a determination control unit 41, an abnormality treatment setting unit 42, and a monitor mechanism setting unit 43. When the determination signal input from the determination unit 6 indicates low level, the determination control unit 41 notifies the abnormality treatment setting unit 42 and the monitor mechanism setting unit 43 of an abnormality treatment signal.

The abnormality treatment setting unit 42 includes a reset request setting unit 42a, an interrupt request setting unit 42b, and an external output request setting unit 42c. The reset request setting unit 42a is capable of selecting and setting whether a reset request to the entire microcomputer 21 or the CPUs 2 and 3 is executed or a reset request is not executed. The reset target may include a peripheral circuit. When the determination control unit 41 inputs the abnormality treatment signal to the reset request setting unit 42a, the reset request setting unit 42a outputs the reset request signal that corresponds to the set reset request type. When "the reset request is not executed", the reset request signal is not output.

The interrupt request setting unit 42b is capable of selecting and setting whether a maskable or non-maskable interrupt request to the CPUs 2 and 3 is executed or the interrupt request is not executed. When there are a plurality of interrupt factors, the interrupt request can include a setting of the priorities. When the determination control unit 41 inputs the abnormality treatment signal to the interrupt request setting unit 42b, the interrupt request setting unit 42b outputs the interrupt request signal that corresponds to the set interrupt request type. When "the interrupt request is not executed", the interrupt request signal is not output.

The external output request setting unit 42c is capable of selecting and setting whether a signal output request to one or more external terminals or all external terminals of the microcomputer 21 is executed or the signal output request is not executed. When the determination control unit 41 inputs the abnormality treatment signal to the external output request setting unit 42c, the external output request setting unit 42c outputs the signal output request signal that corresponds to the signal output request type. When "the signal output request is not executed", the signal output request signal is not output.

The monitor mechanism setting unit 43 includes a delay cycle number setting unit 43a, a self test setting unit 43b, and a CPU operation mode setting unit 43c. When the delay unit 22 is capable of changing the setting of the delay cycle number, the delay cycle number setting unit 43a sets the delay cycle number.

The self test setting unit 43b sets the operation contents of the self test executed on the CPUs 2 and 3, the determination unit 6, the write control unit 24, or the setting unit 8. The CPU operation mode setting unit 43c switches the operation modes of the CPUs 2 and 3 between, for example, the lock step mode, in which the CPUs 2 and 3 execute the identical control programs, and the non lock step mode, in which the CPUs 2 and 3 execute the different control programs.

Figure 14:
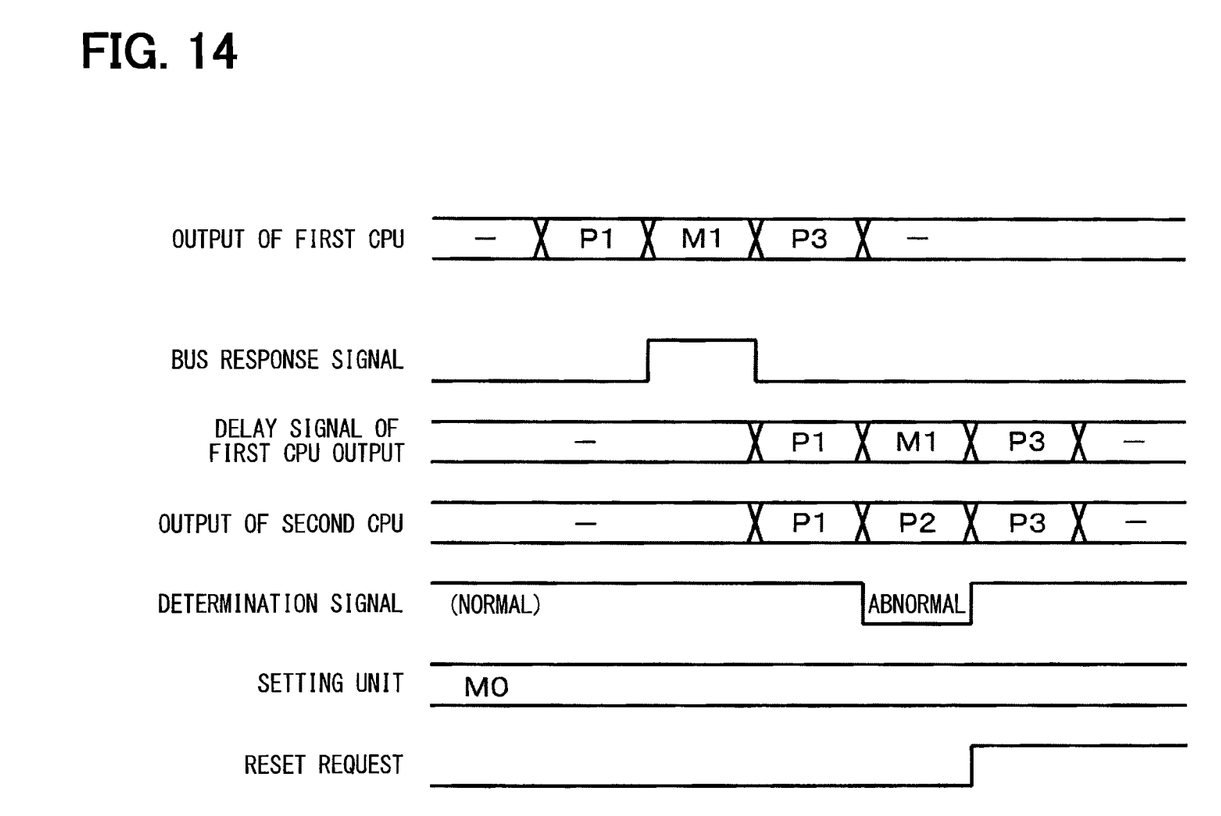
FIG. 14 is a time chart during an abnormal operation.

Next, operations of the eighth embodiment will be described. As shown in FIG. 14, an abnormality similar to the case shown in FIG. 7 of the second embodiment may occur. When "executing the reset request" is set, the reset request setting unit 42a of the abnormality treatment setting unit 42 activates the reset request signal by changing the signal from low level to high level. The interrupt request setting unit 42b may output the interrupt request at the same or different time point. The external output request setting unit 42c may output the signal output request to the outside. Alternatively, each function of the monitor mechanism setting unit 43 may be executed.

As described above, according to the eighth embodiment, the write access is executed to the setting unit 8. When the determination signal input to the determination unit 6 turns to low level, the configuration can causes the reset request setting unit 42a to output the reset request signal as the abnormality handling process. The interrupt request setting unit 42b sets the maskable or non-maskable interrupt request to the CPUs 2 and 3. The external output request setting unit 42c sets the external signal output request via one or more external terminals of the microcomputer 21.

Other Embodiments

The setting unit 8 is not limited to one in which the access result is reflected on the setting unit 8 three cycles after the start of the access by the CPU 2.

The number of delay cycles in the delay unit 22 is not limited to "2".

Each function of the setting unit 8 in the eighth embodiment may be provided with any one or more.

Although the present disclosure has been described in accordance with the examples, it is understood that the disclosure is not limited to such examples or structures. The present disclosure encompasses various modifications and variations within the scope of equivalents. In addition, while the various elements are shown in various combinations and configurations, which are exemplary, other combinations and configurations, including more, less or only a single element, are also within the spirit and scope of the present disclosure.

The invention claimed is:

1. A microcomputer comprising:
first and second CPUs configured to execute identical control programs in parallel;
a write control unit configured to control a write access by the first or second CPU;
a determination unit configured to compare an output of the first CPU with an output of the second CPU; and
a write target unit to which data is written by the write control unit, wherein:
the write control unit is configured to output a write response signal to the first and second CPUs before a write to the write target unit is finished when a data write destination of the first and second CPUs is the write target unit;
the determination unit is configured to output an abnormality determination signal to the write control unit when data output from the first CPU mismatches with data output from the second CPU; and
the write control unit is configured to write the data to the write target unit when the data write destination of the first and second CPUs is the write target unit and the abnormality determination signal is not input to the write control unit.

2. The microcomputer according to claim 1, further comprising:
a first delay unit disposed in a path between the first CPU and the determination unit and configured to add a delay time; and
a second delay unit disposed in a path connecting to the second CPU and configured to add the delay time that causes an input time point of the second CPU to the determination unit to be same as an input time point of the first CPU to the determination unit.

3. The microcomputer according to claim 2, wherein the delay time is two cycles of a system clock.

4. The microcomputer according to claim 2, wherein the first CPU is configured to execute the write access to the write control unit via the first delay unit.

5. The microcomputer according to claim 2, wherein the second CPU is configured to execute the write access to the write control unit.

6. The microcomputer according to claim 1, further comprising a dedicated bus configured to connect the write control unit with the write target unit.

7. The microcomputer according to claim 6, wherein:
a plurality of the write target unit are provided; and
the write control unit is configured to select one of the plurality of write target units and execute a write via the dedicated bus.

8. The microcomputer according to claim 6, wherein:
the first CPU is configured to execute a read access to the write target unit via the dedicated bus.

9. The microcomputer according to claim 1, wherein:
the abnormality determination signal is input to the write target unit; and
the write target unit includes a function that executes an abnormality handling process when the abnormality determination signal is input to the write target unit.

10. The microcomputer according to claim 9, wherein:
the abnormality handling process includes an output of system reset request signal.

11. The microcomputer according to claim 9, wherein:
the abnormality handling process includes an output of interrupt request to the first and second CPUs.

12. The microcomputer according to claim 9, wherein:
the abnormality handling process includes an output of abnormality occurrence signal to an outside.

13. A microcomputer comprising:
first and second CPUs configured to execute identical control programs in parallel;
a write control circuit configured to control a write access by the first or second CPU;
a determination circuit configured to compare an output of the first CPU with an output of the second CPU; and
a write target circuit to which data is written by the write control circuit, wherein:
the write control circuit outputs a write response signal to the first and second CPUs before a write to the write target circuit is finished when a data write destination of the first and second CPUs is the write target circuit;
the determination circuit outputs an abnormality determination signal to the write control circuit when data output from the first CPU mismatches with data output from the second CPU; and
the write control circuit writes the data to the write target circuit when the data write destination of the first and second CPUs is the write target circuit and the abnormality determination signal is not input to the write control circuit.

* * * * *